United States Patent [19]
Mayer et al.

[11] 3,843,140
[45] Oct. 22, 1974

[54] COOLED MECHANICAL SEAL
[75] Inventors: Ehrhard Mayer; Michael Steigenberger, both of Eurasburg, Germany
[73] Assignee: Firma Feodor Burgmann, Jr., Wolfratshausen, Germany
[22] Filed: Nov. 20, 1972
[21] Appl. No.: 308,006

[30] Foreign Application Priority Data
July 7, 1972 Germany............................. 2233381
Nov. 24, 1971 Germany............................. 2158126

[52] U.S. Cl........................ 277/67, 277/15, 277/96, 277/134, 415/110
[51] Int. Cl............................................. F16j 15/40
[58] Field of Search............... 277/3, 15, 22, 67, 96, 277/134, 26; 415/110, 112, 119 A, 170

[56] References Cited
UNITED STATES PATENTS
3,608,910   9/1971   Tyler...................................... 277/22
3,746,350   7/1973   Mayer & Koch..................... 277/15

Primary Examiner—Louis R. Prince
Assistant Examiner—Robert I. Smith
Attorney, Agent, or Firm—Charles Hieken; Jerry Cohen

[57] ABSTRACT

Cooled mechanical seal-pump assembly for a rotatable shaft with turbulence creation in a coolant sealing liquid adjacent the interface of sliding rings which rub together in a hydrodynamic sealing arrangement. The assembly includes a built-in pump for the liquid circulation. The turbulence is created by directing the liquid at the sliding ring interface while accelerating it to a higher velocity. The built-in pump comprises a shaft mounted cylinder rotating within a coaxial stationary cylinder, with one or preferably both cylinders being tapped to provide threads which are of opposite hand if both cylinders are tapped. It is distinctly advantageous, in the context of this pump device for circulation of coolant/seal control fluid, to make the cylinders of materials having different coefficients of thermal expansion to afford a regulating mechanism responsive to and/or acting upon coolant temperature.

8 Claims, 4 Drawing Figures

COOLED MECHANICAL SEAL

CROSS-REFERENCE TO RELATED APPLICATIONS

The co-pending, commonly assigned U.S. patent application, Ser. No. 18,820 filed Mar. 12, 1970, and now U.S. Pat. No. 3,746,350 of Ehrhard Mayer and Rudolf Koch is cited and incorporated herein by reference as though set out at length herein.

BACKGROUND OF THE INVENTION

This invention relates to cooled mechanical seals of the type having an annular channel, extending along the length of a shaft and concentrically surrounding a shaft, which terminates in the sealing clearance. The channel is part of a pumping device and a circulating loop containing a coolant as a cooling medium for the seal.

In known sliding seals of the above type [reference: the book "Mechanical Seals", Dr. Eng. Ehrhard Mayer, 4th. edition, 1970, p. 220], the outer limiting wall of an annular channel is formed from the cylindrical inner surface of the seal housing and the inner limiting wall is formed from the cylindrical outer surface of a rotating carrier for the sliding seal. The liquid cooling medium, which can also be used simultaneously as the sealing medium, is pumped through the channel (by a pumping device which is contained within the channel but axially outside of the seal) past the sealing clearance, and it is then withdrawn through a radial passage in the seal housing.

Other mechanical seals [reference: Ibid, p. 166] have utilized, as a pumping device therefor, passages running in the opposite direction in the bore of the seal housing, such as in the periphery of the carrier of the sliding seal whereby the pressure side of the pumping device is in communication with ring shaped space surrounding the sealing clearance, which also provides a discharge passage for the cooling medium. The passage for circulating the cooling medium through the mechanical seal and a cooler offers advantages of relatively small radial size and high attainable output. However, it was found that by supplementing the increase in the circulated volume of the cooling medium a significant improvement of the desired cooling in the immediate vicinity of the seal clearance is attained and therefore the operating range of the mechanical seal can be improved.

It is known to inject the cooling medium radially in the direction of the seal clearance through a radial inlet hole in the plane of the seal clearance ("Mechanical Seals", p. 6–7). For manufacturing reasons often it is not possible however to provide an inlet tube in the seal housing. Furthermore there is the danger that the stream coming in does not get to the immediate vicinity of the seal clearance but that it is deflected by the fluid layer rotating in the immediate vicinity of the sliding seal. If the injected cooling medium does get into the vicinity of the seal clearance at low peripheral speeds, one can expect an uncontrolled deflection of the stationary and/or rotating ring because of non-uniform cooling action of the coolant.

Reliability and long operating life, as a whole, is a further criterion of dynamic seal design. In many sealed installations, including nuclear power plants, it is desired to have a highly reliable operation without having to perform maintenance, repairs or part replacement over a long period.

It is the principal object of the present invention to apply an improved cooling action of the circulated medium, to the zone immediately adjacent to the sealing clearance of the sliding and rotating seal in mechanical seals, of the type discussed above, to thereby substantially improve the operating range and the function of the mechanical seal.

It is a further object of the invention to provide a long lived, reliable dynamic seal assembly and pump device therefor which provides such improved cooling action consistent with compactness, mass producibility, economy, and/or flexibility of usage of a limited number of models or sizes in a variety of uses.

It is a further object of the invention to provide negative-feedback self regulation of operating conditions by the operating parts of the pump device consistent with one or more of the preceding objects.

SUMMARY OF THE INVENTION

According to the present invention the finally assembled and used combination is a coolant liquid circulating in open or (preferably) closed loop with coolant temperature control (usually a cooler), a rotating shaft and drive and load therefor, a stationary housing with a bore or other opening which the shaft passes through, a hydrodynamic seal with fixed structure attached to the housing and movable structure attached to the shaft to rotate therewith and built-in pump structure also comprising one or more fixed components attached to the housing and one or more movable components attached to the shaft to rotate therewith. The pump is part of the coolant loop and in addition to providing coolant circulation raises the static pressure thereof and feeds it to the dynamic seal in condition to serve as an effective sealing fluid therein. Critical subcombinations thereof include the sealpump assembly subcombination and the pump device per se.

The hydrodynamic seal and pump elements are preferably of the type described in the above cited U.S. application with the seal comprising opposed radial plates with peripheral channels and the pump comprising opposed and cylindrical surfaces with threads of opposite hand thereon.

The cooled mechanical seal-pump assembly for the rotatable shaft comprises means defining an annular ring channel with inner and outer coaxial cylindrical surfaces as its boundaries. These means define the channel to surround the shaft to be sealed and be coaxial therewith and include one (preferably the inner) cylinder connected to the shaft to rotate therewith and a stationary (preferably the outer) cylinder. The relatively movable cylinders define a pump along longitudinally overlapping central portions thereof with a small radial clearance.

Preferably, and with distinct advantage, one or both of the opposed inner and outer confronting cylindrical surfaces are tapped to provide high pitch spiral threads therein and they are made of materials of differing coefficients of thermal expansion with respect to each other, the coefficient differences being significant within the expected range of levels and deviations therefrom expected in coolant temperature. The efficiency of the pump and its ability to develop a high pressure ratio are enhanced by the spiral thread design and coolant fluid pressure and throughput may be varied automatically in response to coolant temperature changes by cylinder spacing clearance variation induced by differential thermal expansion and contraction of the confronting inner and outer cylindrical surfaces. The coolant temperature changes are randomly induced by such factors as seal friction, changes in power or speed input or dynamic loading conditions of the shaft, variations in hydraulic flow resistance or working and heat exchanges efficiency. If desired, coolant temperature can also be deliberately varied to modify pump operation by external means without use of mechanical linkages or changes of shaft speed of any kind.

Turbulence is introduced at the zone of coolant flow adjacent the sealing clearance. This is done, preferably and with distinct advantage, by shaping an annular coolant delivery passage of the pump device to cause acceleration of the fluid as it approaches the said zone and giving the fluid a directional component in the radial sealing plane of the interface of the running rings.

The diameter of the closed outer wall of the ring channel which directs the cooling medium to the sealing clearance starts at a maximum value at a place far from the sealing clearance plane and decreases as it approaches it and, depending on the change in the diameter of the outer limiting wall, the diameter of the associated inner limiting surface of the ring canal decreases so that the effective flow cross-section of the ring canal reaches a minimum value at or immediately ahead of the seal clearance.

Through this construction, a cooling medium guided through a ring channel emerges with an accelerated velocity and simultaneously is directed into the vicinity of the seal clearance. The apparatus works in such a way that the turbulent stream surrounding the seal clearance is continually exchanged with freshly cooled medium.

In a distinctly preferable embodiment of the invention, the outer limiting surface and the inner limiting surface of the ring channel (in reference to a longitudinal section through the shaft axis) are formed in curved shape. From the viewpoints of cooling and economical and practical manufacturing, a particularly advantageous design results when the pumping device is of the form described in the above cited U.S. application and is arranged coaxial with and surrounding the shaft, and extending longitudinally in the direction of the shaft. This pumping device can either be in communication with the pressure side of the ring channel, which conducts the cooling medium to the seal clearance or its suction side can be located in the region of the sealing clearance plane. The effectiveness of this pumping device with respect to the amount of coolant and pressure increase, and therefore also with respect to cooling effectiveness, can be improved by a guide ahead of it on the suction side. The guide terminates at the pumping device with an essentially cylindrical outer surface of a diameter corresponding to that of the base of the outer/thread forming part of the pumping device. The advantages of such a guide are based primarily on a lessening of the turbulence in the feed stream of cooling medium to the suction side of the pumping device.

The above described differential thermal expansion can be achieved by making either the inner cylindrical wall or outer cylindrical wall, preferably the latter, of higher coefficient of thermal expansion. Typically the materials of construction will be (a) for low coefficient, INVAR iron alloy [i.e., 64% Fe, 36% Ni] having a coefficient of $0.9 \times 10^{-6}°C^{-1}$ or (b) for high coefficient (b1) austenitic steels [18% Cr, 8% Ni, balance Fe] at $17 \times 10^{-6}$, (b2) ebonite [hard rubber] at $54 \times 10^{-6}$, (b3) polytetrafluoroethylene at $70 \times 10^{-6}$. Other choices of (a) or (b) may be used, the coefficient differential being at least $5 \times$ to achieve significant variations and preferably about $20$–$50 \times$ as above. Such differential expansion should preferably be limited to the axial length of the pump device by using discrete parts for the pump device portion of the larger assembly.

The self-regulation mechanisms thus provided include the following.

If the inner material has the larger coefficient the effect of increasing coolant temperature is to decrease radial separation of the inner and outer elements, varying the pressure created by the pumping device approximately as the square of separation variance. The decrease of separation would increase liquid flow through a cooler and increase the rate of liquid exchange through the system to tend to lower coolant temperature.

On the other hand, providing the larger coefficient to the outer material increases radial separation of the inner and outer elements, and thereby decreases liquid throughput and pump output pressure, in response to liquid temperature rise. This combination can be used to advantage in systems where shaft speed changes or for a single seal model or size used for various shaft installations where different rotational speeds. A heat exchanger with excess cooling capacity (in relation to seal cooling needs per se) is provided.

Other objects, features and advantages of the invention will be apparent from the following detailed, description taken in connection with the accompanying drawings wherein.

DETAILED DESCRIPTION OF PREFERRED EMBODIMENTS

Figure 1:
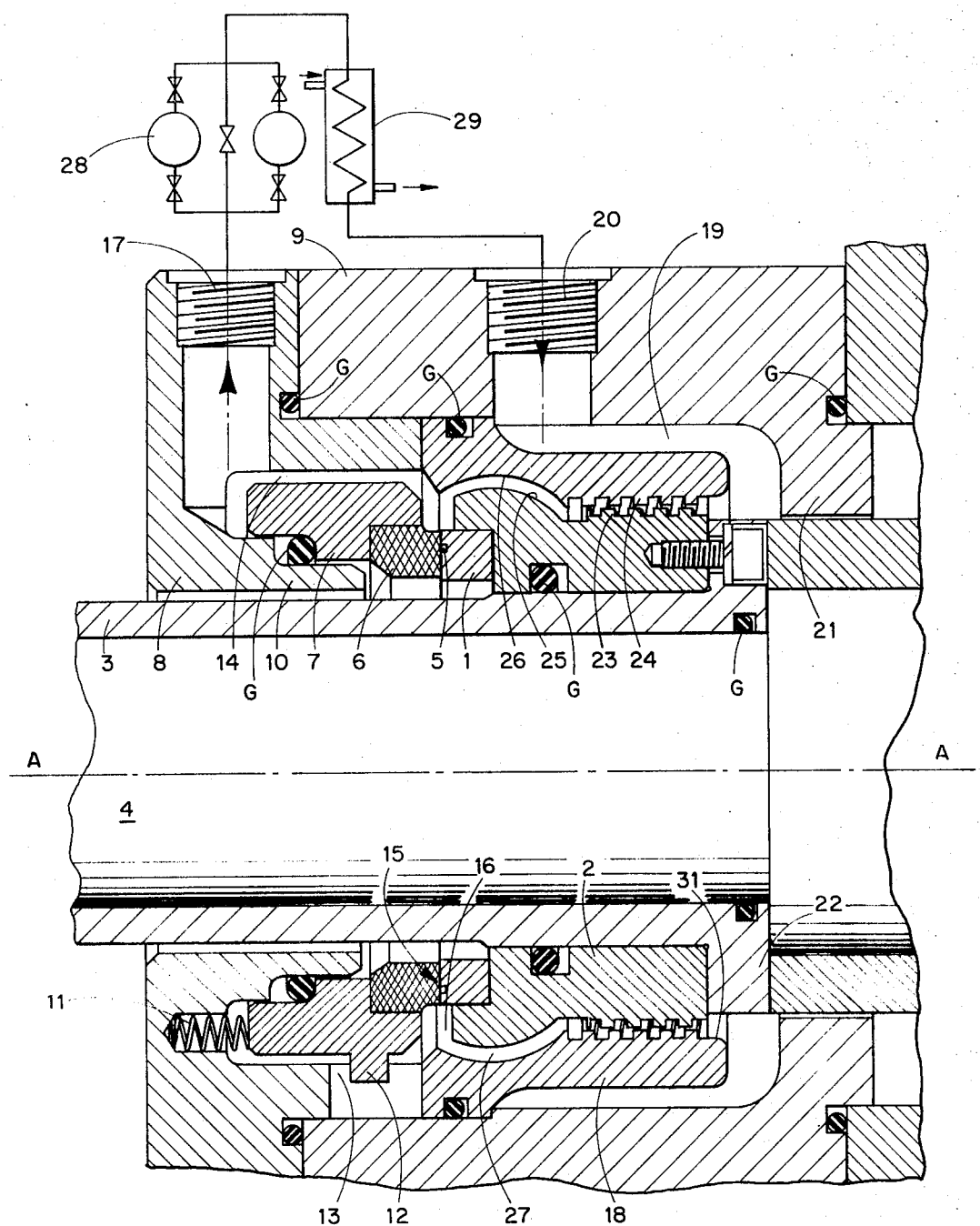
FIG. 1 is a longitudinal section through a first embodiment of the invention.

Referring now to the drawings, FIG. 1 shows a rotating ring 1 which sits in a carrier tube 2 which is prevented from turning by a shaft sleeve 3 and which is locked from movement in the axial direction and sealed on the shaft 4. The rotating ring 1 is provided with one or more circulation slots 5 for hydrodynamic running and a sliding seal 6 ring which sits in a carrier 7. The carrier 7 is loosely seated on the cylindrical outer surface of a collar 10 protruding from the housing cover 8 adjacent to a shaft sleeve 3 and is urged towards the inside of housing 9 by springs 11 in the axial direction of shaft 4. A radially protruding lip 12 is inserted in a recess 13 of the housing cover 8 running parallel to the longitudinal axis A—A and prevents the carrier 7 from turning.

The part of the housing cover 8 surrounding the carrier 7 is formed as a cylindrical hole in whose periphery the cylindrical carrier 7 is located with such an amount of play that a ring channel 14 is formed which ends on one axial end at the annular chamber 16 and whose other side is in communication with a discharge hole 17 formed in the housing cover 8.

The rotating ring carrier 2 is surrounded in its entire axial length by a sleeve 18 which is fastened to the housing 9 at its axial end near the sealing clearance and at a regional larger diameter. Going out from this end, the cylindrical outer surface is spaced from the bore of the housing 9 so that a ring shaped space 19 remains. An inlet hole 20, penetrating through the housing, terminates in the space 14. A housing end flange 21 is set against the housing cover 8. The space 19 protrudes inwardly between flange 21 and sleeve 18 toward the cylindrical surface of a shoulder element 22 provided on the shaft sleeve 3.

A first axial section of the outer surface of the carrier 2, near the sealing clearance 15, is formed smooth and has (in a longitudinal section) the form of a convex arc 25 while a second axial section of the surface is formed as an outer pumping thread with a diameter of the base of the thread corresponding closely to that of the surrounding surface of the shoulder 22. The inner surface of sleeve 18 is essentially complementary to the above described outer surface of the carrier 2. In other words, it has on a first part of its axial length is a concave smooth section 26 while the second part is provided with an inner pumping thread 24. The thread 23 rotating with shaft 4 and stationary thread 24 are of helical form with opposed spiral twists (hand) and act as a highly effective pump. The thread 24 is not carried through to the free end of the sleeve 18 but extends itself with a short cylindrical bore 31 whose diameter is essentially equal to the diameter of the base of the inner thread 24 so that the bore, which may have a rounded edge 31, raises the efficiency of the flow.

The convex surface 25 and the surrounding concave surface 26 which is at a distance from it form a ring channel 27 which connects the high pressure side of the pumping device formed by the outer thread 23 and the inner thread 24 with the chamber 16.

As shown schematically in FIG. 1, the discharge hole is connected to the inlet hole 20 through a magnetic filter 28 and a heat exchanger 29. In operation, the seal housing 9 is filled with a sealing fluid or another cooling or buffering fluid. During turning of the shaft 4, the fluid is sucked by means of the stationary outer and rotating inner threads 23 and 24, respectively, which act as a pump, from the space 17 and into the ring channel 27 which leads to the chamber 16. Before leaving the ring channel 27 the fluid is accelerated due to the reduced cross-section on the discharge side.

The reduction in cross-section on the discharge side can also be made more pronounced by a corresponding reduction of the separation between the limiting surfaces 25, 26. Due to the form of the ring channel 27, the exiting fluid stream receives a direction component of velocity toward the seal clearance 15. The minimal diameter of surface 26 is achieved in the vicinity of the plane of sealing clearance. By means of this construction, the fluid which has been cooled in its passage through the loop by heat exchanger 29 reaches the zone immediately adjacent to the seal clearance 15 next to the sliding seal 6 and the rotating seal 1 and brings about their intensive cooling. At the same time, possible gas bubbles are rinsed out due to the turbulence in the chamber 16 by the accelerated fluid flow. The warmed fluid leaves the chamber 16 through the ring channel 14 and travels through the discharge hole 17, magnetic filter 28 and heat exchanger 29 and then through the entrance hole 20 back into the ring shaped space 19 pumping device 23, 24. The flow of fluid is by the rounding of the outer surface and end surface of sleeve 18. This establishes a quiet flow pattern at the pump entrance which improves the pump's effectiveness with respect to the amount of fluid pumped and the pressure increase attained.

Figure 2:
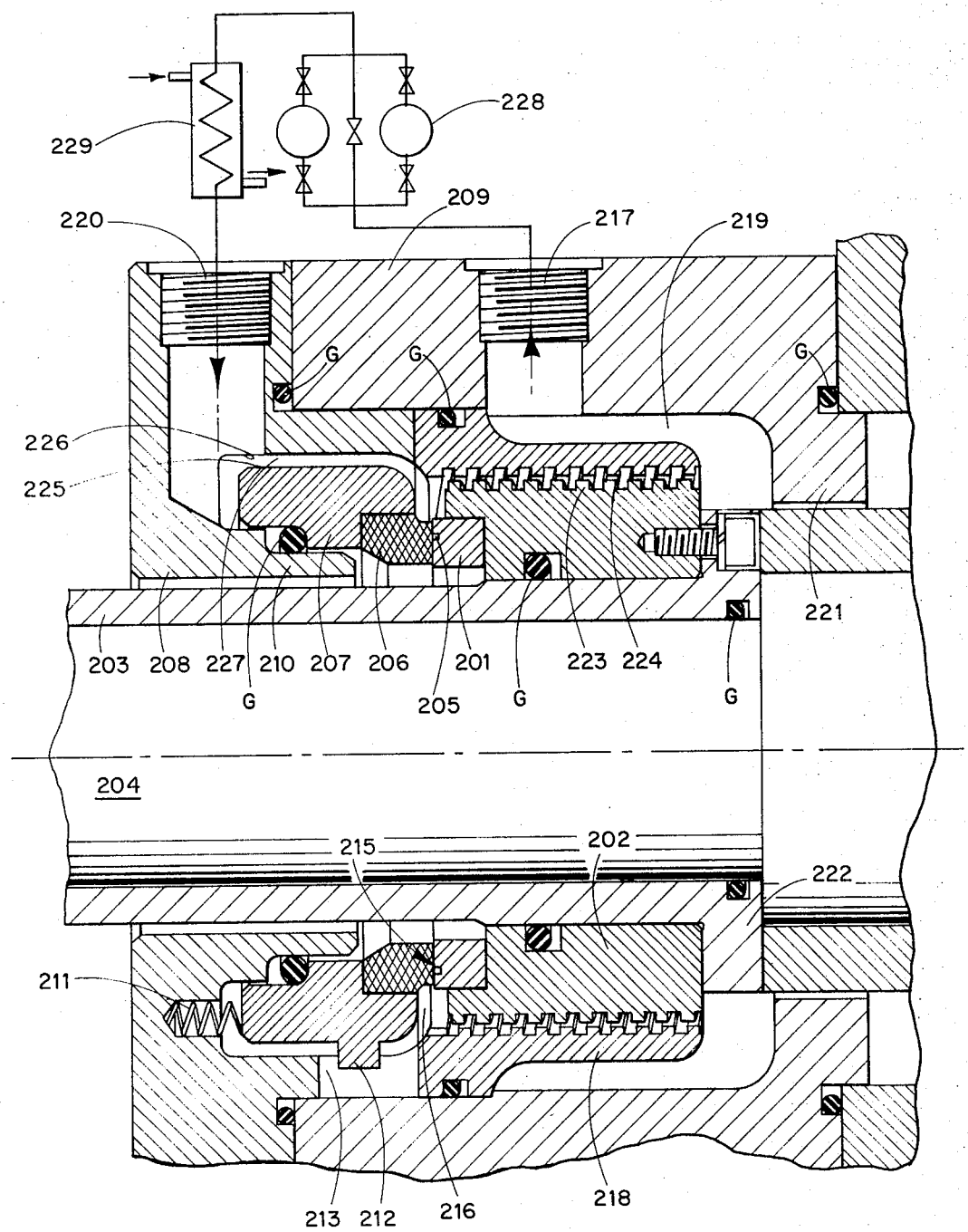
FIG. 2 is a longitudinal section through a second embodiment of the invention.

FIG. 2 shows a second embodiment of the invention with a reversed fluid flow direction compared to the FIG. 1 embodiment. Parts of the FIG. 2 embodiment have a corresponding reference numeral plus 200. This embodiment allows longer axial length of pump in a given seal volume.

Figure 3:
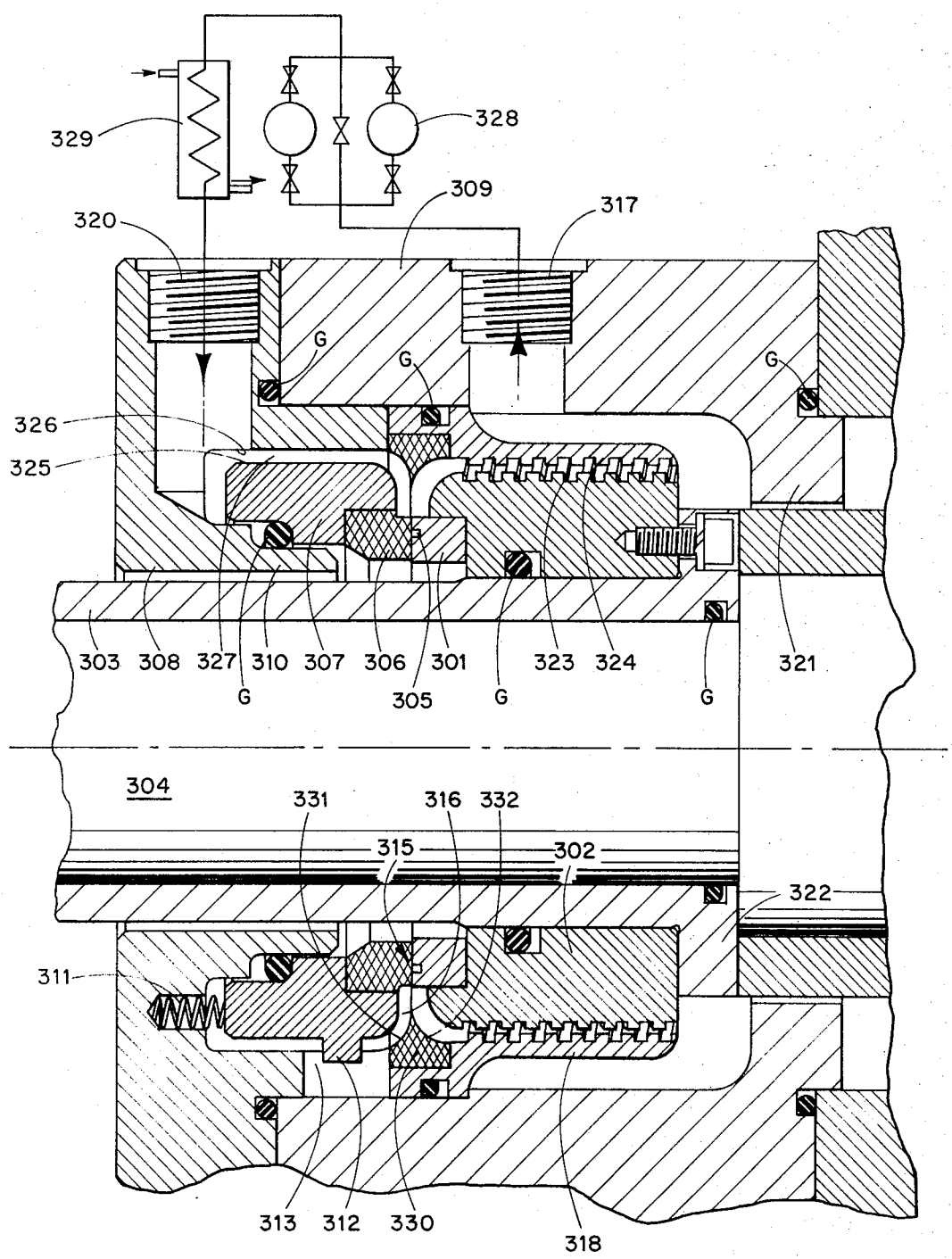
FIG. 3 is a longitudinal section through a third embodiment.

FIG. 3 shows a third embodiment which is similar to the FIG. 2 embodiment, similar parts having the same reference numeral plus 100 (300 compared to FIG. 1). However, in the FIG. 3 embodiment, a ring 330 is added which has double concave sections, 331 and 332. Section 331 extends the concave rounding the surface 326 and section 332 provides a smoothing transition for fluid flow to the pump entrance.

In all the embodiments, sealing O-ring gaskets are provided as indicated at G throughout.

Figure 4:
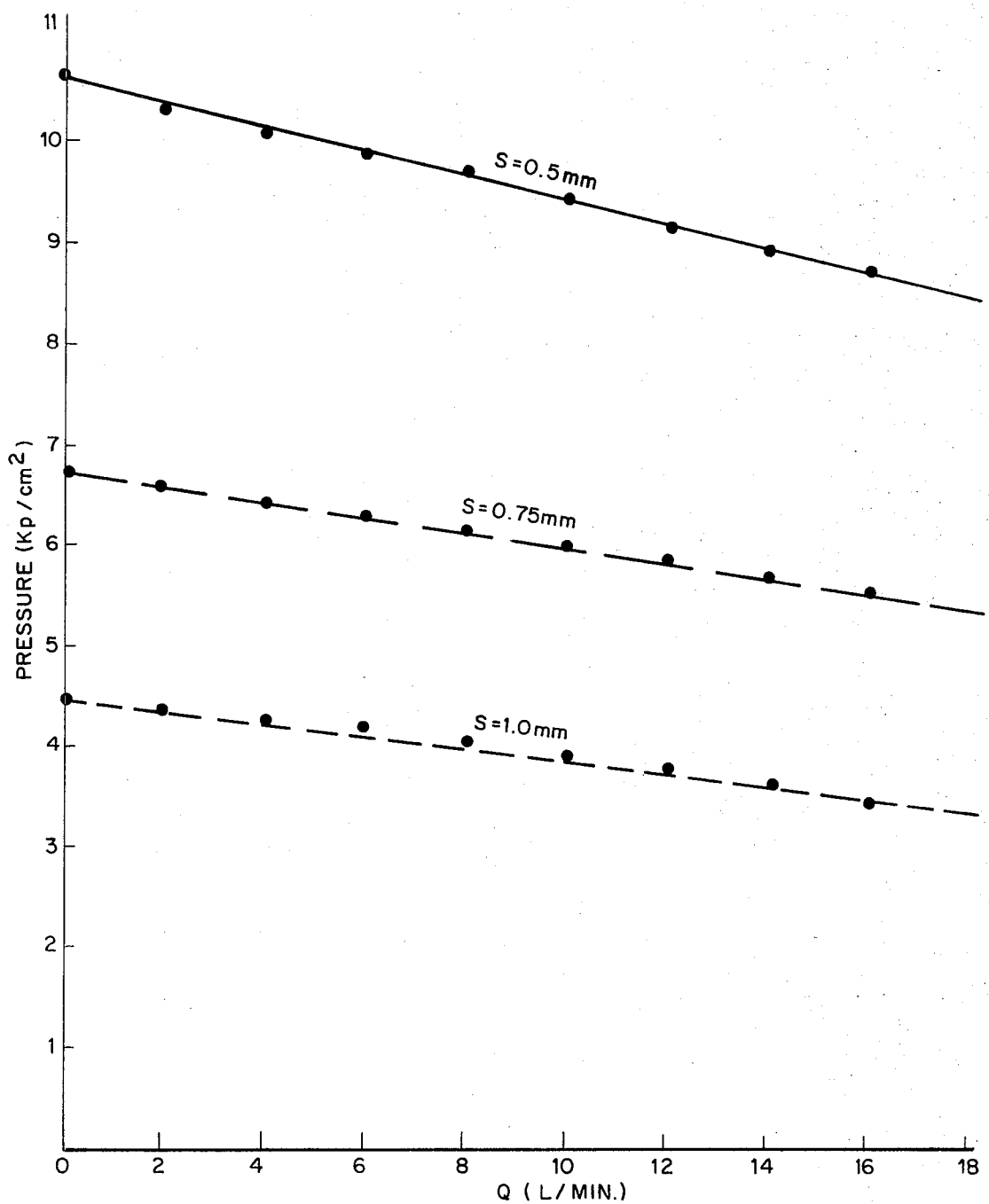
FIG. 4 is a curve of performance data illustrating a self-regulating feature of the invention.

FIG. 4 shows a performance curve of pump outlet pressure ($KP/Cm^2$) (1 $KP/Cm^2$ being equivalent to 14,3 psi) vs. throughput liquid flow (liters/min.) for three conditions of radial play spacing, S, between the innermost cylindrical surface of threads 24 of the part 2 and the outermost cylindrical surface of threads 23 in FIG. 1. The spacings, S, are taken from crown to crown of the opposing thread sets, and not from thread base to base, are 1.0, 0.75 and 0.5mm. in the three curves of FIG. 4. The data were taken for a shaft 4 rotating at 7333 revolutions per minute and the part 2 had a base diameter at its threads of 95mm.

It is distinctly advantageous to have a radial play S between thread crowns of 0.2–1.5mm. and preferably of 0.5mm.

The threads 23 and 24 of FIG. 1 and their FIG. 2 and 3 analogs have essentially square cross sections and square grooves therebetween and a pitch greater than the total axial threaded length. They are preferably made by machining out of initially smooth cylindrical surfaces of parts 2 and 18.

Unless otherwise stated, all percents herein are weight percent.

It is evident that those skilled in the art may now make numerous bases and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A shaft sealing assembly with a rotatable shaft and a pump device for circulating a coolant liquid medium, a housing stationary relative to said shaft and provided with a wall having a bore, said housing being provided with openings for admission and discharge of said medium, said shaft extending through said bore; sealing means comprising a slide-ring unit coaxially surrounding said shaft within said bore and arranged for movement axially of said shaft under resilient pressure; a counter-ring unit similar to said slide ring unit but prevented from axial movement relative to said shaft when in operating position; one of said ring units being mounted for rotation with said shaft and the other being fixedly supported on the housing, and each of said ring units having an end face for mutual contact under said resilient pressure to form a sealing interface with an annular outside edge, a ring channel with a portion passing over the outside edge of said interface and interconnecting said admission and discharge openings, means located in said channel for propelling said medium through said channel, and a portion of said channel immediately ahead of the outside edge of said interface being defined between a fully annular convex inner wall and fully annular concave outer wall as a converging channel for accelerating said coolant liquid flow and directing the increased velocity flow radially inwardly toward said outside edge of the interface.

2. A cooled mechanical seal assembly as set forth in claim 1 wherein the suction side of the pump is preceded in channel flow series by a guide which terminates an essentially cylindrical bore at the pumping transport passage with a diameter corresponding to the base of the transport passage.

3. A cooled mechanical seal assembly as set forth in claim 1 wherein the liquid propelling means are formed by radially spaced confronting cylindrical surfaces which surround the shaft and are coaxial with it and extend longitudinally, and wherein the said ring channel portion adjacent the sealing clearance is in direct fluid communication with the liquid outlet side of the liquid propelling means.

4. A cooled mechanical seal assembly as set forth in claim 3 wherein the suction side of the pump is preceded in channel flow series by a guide which terminates an essentially cylindrical bore at the pump inlet with a diameter corresponding to the base of the inner pump defining cylinder.

5. The apparatus of claim 1 wherein said fluid propelling means comprise first cylinder defining means defining an outer cylindrical surface and second cylinder defining means defining an inner cylindrical surface slightly outside of, axially overlapping with, and coaxial with said outer cylindrical surface to form an annulus therebetween.

6. The apparatus of claim 5 wherein at least one of said cylindrical surfaces is threaded.

7. The apparatus of claim 6 wherein both of said cylindrical surfaces are threaded, the threads being of opposite hand.

8. The apparatus of claim 5 wherein said means defining the cylindrical surfaces have differential coefficients of thermal expansion and are constructed to allow said differential expansion to vary the radial spacing between the cylinders in response to changes in temperature.

* * * * *